United States Patent [19]

Danielson

[11] 4,249,946
[45] Feb. 10, 1981

[54] DETERGENT-DURABLE GLASSES
[75] Inventor: Paul S. Danielson, Big Flats, N.Y.
[73] Assignee: Corning Glass Works, Corning, N.Y.
[21] Appl. No.: 90,514
[22] Filed: Nov. 2, 1979
[51] Int. Cl.$^3$ ................................................. C03C 3/08
[52] U.S. Cl. ........................................ 106/54; 106/52
[58] Field of Search ........................................... 106/54

[56] References Cited
U.S. PATENT DOCUMENTS

| | | | |
|---|---|---|---|
| 1,130,767 | 3/1915 | Schott | 106/54 |
| 1,143,732 | 6/1915 | Schott | 106/54 |
| 3,709,705 | 1/1973 | Hagedorn | 106/54 |
| 3,784,387 | 1/1974 | Sack | 106/54 |

Primary Examiner—Helen M. McCarthy
Attorney, Agent, or Firm—Clinton S. Janes, Jr.

[57] ABSTRACT

This invention is drawn to the production of transparent glasses which display exceptional resistance to attack by detergents such as are utilized in commercial dishwashers, thereby rendering such glasses eminently suitable for food service ware and, in particular, drinkware articles. The glasses strongly resist the development of iridescence, an undesirable phenomenon frequently occurring in transparent glasses used for food service after exposure to dishwasher detergents. Operable compositions consist essentially, expressed in weight percent on the oxide basis as calculated from the batch, of:

| | |
|---|---|
| $Na_2O$ | 8–12% |
| $K_2O$ | 0–5 |
| $Na_2O + K_2O$ | 8–12 |
| $Al_2O_3$ | 7–10 |
| $B_2O_3$ | >1 but <5 |
| CaO | 0–10 |
| MgO | 0–5 |
| SrO | 0–10 |
| BaO | 0–10 |
| ZnO | 0–5 |
| CaO + MgO + SrO + BaO + ZnO | 7.5–13 |
| $SiO_2$ | Remainder (>65) |

2 Claims, No Drawings

DETERGENT-DURABLE GLASSES

BACKGROUND OF THE INVENTION

The glass art has devised numerous tests to measure the durability of a glass, i.e., the resistance of the glass to attack by such chemical agents as acids and bases. The majority of these tests utilizes two general thrusts, viz., either a quantitative determination of the change in weight of a particular sample before and after exposure to the chemical agent or an analysis of the leachant or attacking agent to learn which elements and how much thereof have been removed from the sample.

However, consumer studies have indicated that most frequently qualitative changes in appearance are viewed by the customer as indicative of the chemical durability of a product, rather than any weight loss resulting from corrosion. Upon reflection, such a finding would be self-evident since the consumer is normally only interested in the aesthetic appearance of a particular product and is not concerned with minuscule losses in weight thereof unless, of course, such losses give rise to the development of porosity or other flaws in the surface of the product. One such qualitative change in appearance, viz., iridescence, is a common phenomenon appearing in glassware subjected to strong detergent solutions (bases) of the type employed in home dishwashers or commercial dishwashers in food service facilities, e.g., restaurants, hospitals, schools, etc.

The mechanism underlying the development of iridescence is believed to involve the chemical leaching of the glass surface. Hence, the attacking solution selectively dissolves out certain components of the glass, leaving behind a porous network of material (in the common silicate glasses of commerce the network material will be silica-rich), the thickness and refractive index of which lead to the production of the various blue, purple, and yellow interference colors distinctive of iridescence. It has been learned that many factors contribute to the initiation and extent of chemical attack suffered by a particular glass. When dealing with detergent solutions, significant elements to be considered affecting the rate of leaching include the type and concentration of anions in the solution, the temperature, and the pH of the solution.

Among the most prevalent anions encountered in commercially-marketed detergents are phosphates, polyphosphates, various soluble silicates, carbonate, and bicarbonate. Consequently, because it is not known which type of detergent will be utilized by the consumer, the glassware to be used in food service applications must be capable of resisting attack by all of those anions.

OBJECTIVE OF THE INVENTION

The primary objective of the instant invention is to produce glasses especially suitable for the manufacture of food service were manifesting exceptional resistance to attack by detergents used in commercial dishwashers, as evidenced by the absence of iridescence in the glass surface, and, in particular, resistance to attack by phosphates, polyphosphates, various silicates, carbonate, and bicarbonate.

SUMMARY OF THE INVENTION

I have discovered that the above objective can be achieved in transparent glass compositions within a narrow range of the $R_2O$-$RO$-$B_2O_3$-$Al_2O_3$-$SiO_2$ system, wherein $R_2O$ consists of $Na_2O$ and, optionally, $K_2O$, and $RO$ consists of at least one member of the group $MgO$, $CaO$, $SrO$, $BaO$, and $ZnO$. Thus, the operable compositions consist essentially, expressed in weight percent on the oxide basis as calculated from the batch, of:

| | |
|---|---|
| $Na_2O$ | 8–12 |
| $K_2O$ | 0–5 |
| $Na_2O + K_2O$ | 8–12 |
| $Al_2O_3$ | 7–10 |
| $B_2O_3$ | >1 but <5 |
| $MgO$ | 0–5 |
| $CaO$ | 0–10 |
| $SrO$ | 0–10 |
| $BaO$ | 0–10 |
| $ZnO$ | 0–5 |
| $MgO + CaO + SrO + BaO + ZnO$ | 7.5–13 |
| $SiO_2$ | Remainder (>65) |

In order to simulate consumer use conditions, an accelerated test was developed in the laboratory for determining the propensity of a particular glass to display iridescence after exposure to detergents. This test involved formulating a solution containing 12.6 grams sodium carbonate monohydrate [$Na_2CO_3.H_2O$], 12.6 grams tetrasodium pyrophosphate decahydrate [$Na_4P_2O_7.10H_2O$], and 4.8 grams sodium metasilicate nonahydrate [$Na_2SiO_3.9H_2O$] made up with distilled water to one liter. This solution demonstrates a pH of about 12. Test samples of glasses were immersed into the solution operating at 95° C. for a period of 20 hours. That such practice provides results closely equivalent to those observed after several years exposure utilizing a home dishwasher and detergent has been confirmed through comparing the results obtained after exposure of the glass to 650 cycles in a home dishwasher with detergent.

The presence of at least 7% $Al_2O_3$ is vital to securing the desired resistance to iridescence. However, $Al_2O_3$ contents greater than 10% are not necessary for durability and tend to create melting and forming problems.

The total $R_2O$ ought not to exceed 12% since durability of the glass is adversely affected. Nevertheless, the $R_2O$ level should not fall below 8% since the glass becomes hard (the softening point is sharply raised) and the melting quality of the glass is deleteriously affected.

At least 1% $B_2O_3$ is included to help maintain a temperature-viscosity relationship favorable for forming food service ware products, particularly drinkware articles. Amounts of $B_2O_3$ approaching 5%, however, exert a detrimental effect upon the durability of the glass.

The alkaline earth metals and zinc appear to affect the glass compositions in a like manner to that demonstrated by the alkali metals. Accordingly, they will be held within the above-cited ranges to insure good durability coupled with suitable melting and forming behavior.

$SiO_2$ comprises the remainder of the composition. Good durability, however, requires $SiO_2$ to be present in excess of 65%.

Whereas minor amounts of extraneous compatible metal oxides may be included, e.g., $ZrO_2$, $TiO_2$, and $CdO$, the preferred compositions will consist essentially entirely of the basic $R_2O$-$RO$-$B_2O_3$-$Al_2O_3$-$SiO_2$ quinary and the total of all such additions will not exceed about 3%.

It will be appreciated that well-known colorants such as the transition metal oxides and rare earth metal oxides may optionally be included in the inventive compositions in conventional amounts. For example, up to about 1% total of such transition metal oxides as CoO, NiO, $Cr_2O_3$, $V_2O_5$, CuO, MnO, and $Fe_2O_3$ and/or up to about 5% total of such rare earth metal oxides as $Pr_2O_3$, $Nd_2O_3$, and $Er_2O_3$ may usefully be incorporated into the composition.

PRIOR ART

Glasses having compositions within the $R_2O$-RO-$B_2O_3$-$Al_2O_3$-$SiO_2$ system are known to the prior art. Illustrative of such disclosures are U.S. Pat. Nos. 1,130,767 and 1,143,732. Both of those patents describe glasses statedly exhibiting very good chemical durability.

U.S. Pat. No. 1,130,767 discloses glasses consisting essentially, in weight percent, of 4–15% $Al_2O_3$, 3–11% CaO, 5–15% $B_2O_3$, 4–14% $R_2O$, and at least 50% $SiO_2$. No working examples of operable compositions are provided.

U.S. Pat. No. 1,143,732 statedly covers further investigations regarding the glasses of U.S. Pat. No. 1,130,767 and presents glasses consisting essentially, in weight percent, of 4–15% $Al_2O_3$, 5–15% $B_2O_3$, 4–14% $R_2O$, 0–7.8% MgO, 0–15.9% ZnO, 0–30% BaO, and 0–11% CaO, the total of MgO+ZnO+BaO+CaO being equivalent (on the molecular basis) to 3–11% CaO, and at least 50% $SiO_2$. All of the working examples contained 13% $R_2O$, 10% $B_2O_3$, and 12% $Al_2O_3$. The greatest $SiO_2$ content of any working example was 62.8%. Such compositions are outside the operable ranges of the present inventive glasses.

DESCRIPTION OF THE PREFERRED EMBODIMENTS

The following table reports a group of compositions, expressed in terms of parts by weight on the oxide basis as calculated from the batch, illustrating the glasses of the present invention. Inasmuch as the sum of the individual components totals or closely approximates 100, for all practical purposes the recited values can be deemed to represent percent by weight. The actual batch ingredients may comprise any materials, either the oxide or other compound, which, when melted in combination with the other constituents, will be converted into the desired oxide in the proper proportions.

Batches for the cited exemplary compositions were compounded in the indicated proportions and ball-milled to aid in obtaining a homogeneous melt. Each batch was placed in a platinum or silica crucible and the crucible introduced into an electrically-heated furnace operating at about 1500°–1550° C. After melting for about six hours, the molten batch was formed into a slab having dimensions of about 6"×6"×0.75" and the slab transferred immediately to an annealer operating at about 590°–620° C., depending upon the glass composition.

ZnO and $K_2O$ are listed in several of the reported compositions as being present in trace amounts. Those notations arose from those oxides being included as impurities in the batch ingredients employed. In commercial melting of the compositions, a fining agent, such as $As_2O_3$ and/or $Sb_2O_3$, may be added in conventional amounts.

The table also records the softening point (Soft.) and annealing point (Ann.) of each glass, reported in °C., and the coefficient of thermal expansion (Exp.) of each, recited over the range of 20°–300° C. in terms of $\times 10^{-7}/°C.$, as determined from the above-described slabs. The measurements were conducted in accordance with methods conventional in the glass art.

Finally, the table also presents a visual qualitative appraisal of any chemical attack in terms of iridescence (Irid) after an immersion of the several samples into the above-described test solution for a period of 20 hours at 95° C. The slab samples were fractured prior to immersion into the hot solution such that the solution would contact "as-formed" surfaces and newly-fractured surfaces, thereby permitting observation of any differences in behavior evidenced by the surface and bulk glass.

TABLE

| | 1 | 2 | 3 | 4 | 5 | 6 |
|---|---|---|---|---|---|---|
| $SiO_2$ | 68.4 | 68.8 | 65.9 | 67.8 | 68.4 | 67.6 |
| $Al_2O_3$ | 8.2 | 8.3 | 7.9 | 8.1 | 8.2 | 8.3 |
| $B_2O_3$ | 4.0 | 4.0 | 10.2 | 3.9 | 3.97 | 4.7 |
| $Na_2O$ | 10.0 | 9.0 | 9.7 | 9.9 | 10.0 | 10.1 |
| $K_2O$ | — | 1.7 | — | — | trace | trace |
| CaO | 9.2 | 6.0 | 6.8 | 7.0 | 9.2 | 9.3 |
| BaO | — | — | 5.6 | — | — | — |
| MgO | 0.12 | 2.2 | 0.1 | 0.1 | 0.12 | 0.13 |
| ZnO | — | — | — | 3.1 | — | — |
| Soft. | 785 | 795 | 778 | 788 | 787 | 783 |
| Ann. | 590 | 587 | 583 | 589 | 601 | 602 |
| Exp. | 71 | 69 | 72 | 69 | 70.4 | 69.8 |
| Irid. | None | None | None | None | None | None |

| | 7 | 8 | 9 | 10 | 11 |
|---|---|---|---|---|---|
| $SiO_2$ | 68.0 | 70.0 | 68.7 | 71.0 | 70.0 |
| $Al_2O_3$ | 8.6 | 6.8 | 6.3 | 5.8 | 6.7 |
| $B_2O_3$ | 3.9 | 4.0 | 5.3 | 4.0 | 3.9 |
| $Na_2O$ | 8.7 | 10.0 | 10.1 | 10.0 | 8.7 |
| $K_2O$ | trace | — | — | trace | trace |
| CaO | 10.2 | 9.2 | 9.3 | 9.2 | |
| MgO | 0.12 | 0.1 | 0.1 | trace | trace |
| ZnO | trace | — | — | — | trace |
| Soft. | 820 | 781 | 778 | 774 | 804 |
| Ann. | 614 | 593 | 589 | 590 | 609 |
| Exp. | 66.6 | 70.0 | 71.0 | 69.0 | 67.0 |
| Irid. | None | Slight Irid. | Heavy Irid. | Heavy Irid. | Slight Irid. |

As can be seen from the above table, the softening points of the glass compositions are relatively high, viz., greater than about 770° C. This feature permits the use of high temperature decorations, thereby allowing the application of decorations, where desired, of greater durability. The coefficient of expansion (20°–300° C.), ranging between about $65–75\times 10^{-7}/°C.$, is sufficiently high to promote good thermal tempering for enhanced mechanical strength.

The criticality of $Al_2O_3$ content in achieving good resistance to the simulated detergent solution is evident in a comparison of Examples 8–11 with Examples 1–7. Also, the adverse effect which levels of $B_2O_3$ above 5% have upon the resistance of the glasses to detergents is made clear in Example 9.

Example 1 constitutes the most preferred embodiment of the inventive compositions.

I claim:

1. A transparent glass displaying exceptional resistance to attack by detergents, i.e., displaying no iridescence after immersion for 20 hours at 95° C. in an aqueous solution containing 12.6 grams $Na_2CO_3.H_2O$, 12.6 grams $Na_4P_2O_7.10H_2O$, and 4.8 grams $Na_2SiO_3.9H_2O$ made up with distilled water to one liter, having a softening point in excess of 770° C., and a coefficient of thermal expansion (20°–300° C.) ranging between about 65–75×10⁻⁷/°C. which consists essentially, expressed in weight percent on the oxide basis as calculated from the batch, of:

| | |
|---|---|
| Na$_2$O | 8.7–10.1 |
| K$_2$O | 0–1.7 |
| Na$_2$O + K$_2$O | 8.7–10.7 |
| Al$_2$O$_3$ | 7.9–8.6 |
| B$_2$O$_3$ | 3.8–4.7 |
| CaO | 6.0–10.2 |
| MgO | 0.1–2.2 |
| BaO | 0–5.6 |
| ZnO | 0–3.1 |
| CaO + MgO + BaO + ZnO | 8.2–12.5 |
| SiO$_2$ | 65.9–70.0 |

2. A transparent glass according to claim 1 having the following approximate composition:

| | |
|---|---|
| Na$_2$O | 10.0 |
| Al$_2$O$_3$ | 8.2 |
| B$_2$O$_3$ | 4.0 |
| CaO | 9.2 |
| MgO | 0.12 |
| SiO$_2$ | 68.4 |

* * * * *

UNITED STATES PATENT AND TRADEMARK OFFICE
CERTIFICATE OF CORRECTION

PATENT NO. : 4,249,946
DATED : June 4, 1981
INVENTOR(S) : Paul S. Danielson

It is certified that error appears in the above-identified patent and that said Letters Patent are hereby corrected as shown below:

Column 1, line 59, change "were" to -- ware --.

Column 4 in the Table, vertical column 3, line 22, change "10.2" to -- 3.8 --.

Column 4 in the Table, vertical column 11, line 36, insert -- 10.2 --.

Signed and Sealed this

Eighteenth Day of August 1981

[SEAL]

Attest:

GERALD J. MOSSINGHOFF

Attesting Officer  Commissioner of Patents and Trademarks